United States Patent
Wada

(10) Patent No.: US 9,223,584 B2
(45) Date of Patent: Dec. 29, 2015

(54) INFORMATION PROCESSING APPARATUS, RESTORING METHOD OF BIOS SETUP, RESTORING PROGRAM

(75) Inventor: Daisuke Wada, Tokyo (JP)

(73) Assignee: NEC CORPORATION, Tokyo (JP)

(*) Notice: Subject to any disclaimer, the term of this patent is extended or adjusted under 35 U.S.C. 154(b) by 823 days.

(21) Appl. No.: 13/332,153

(22) Filed: Dec. 20, 2011

(65) Prior Publication Data

US 2012/0166785 A1 Jun. 28, 2012

(30) Foreign Application Priority Data

Dec. 27, 2010 (JP) ............... P2010-289177

(51) Int. Cl.
*G06F 9/00* (2006.01)
*G06F 9/44* (2006.01)
*G06F 11/14* (2006.01)

(52) U.S. Cl.
CPC .......... *G06F 9/4411* (2013.01); *G06F 11/1417* (2013.01)

(58) Field of Classification Search
CPC ............................ G06F 9/4411; G06F 11/1417
See application file for complete search history.

(56) References Cited

U.S. PATENT DOCUMENTS

| | | | | |
|---|---|---|---|---|
| 4,989,082 | A * | 1/1991 | Hopkins | 382/151 |
| 2008/0126777 | A1* | 5/2008 | Chang et al. | 713/2 |
| 2008/0198411 | A1* | 8/2008 | Ogasawara et al. | 358/1.16 |
| 2010/0250910 | A1* | 9/2010 | Watanabe | 713/2 |

FOREIGN PATENT DOCUMENTS

| | | | |
|---|---|---|---|
| JP | 2000235483 | A | 8/2000 |
| JP | 2000-322333 | A | 11/2000 |
| JP | 2006190061 | A | 7/2006 |
| JP | 2007128493 | A | 5/2007 |
| JP | 2008200943 | A | 9/2008 |
| JP | 2009211170 | A | 9/2009 |
| JP | 2010081485 | A | 4/2010 |
| JP | 2010224847 | A | 10/2010 |

OTHER PUBLICATIONS

Japanese Office Action for JP2010-289177 mailed on Dec. 21, 2012.

* cited by examiner

*Primary Examiner* — Kim Huynh
*Assistant Examiner* — Vincent Chang

(57) ABSTRACT

An information processing apparatus compares a first device model information of the information processing apparatus with second device model information stored in a nonvolatile memory unit being externally connected to the information processing apparatus, and compares first device identification information of the information processing apparatus with second device identification information stored into the nonvolatile memory unit based on detection of a boot-up. When the device model information comparison process is determined to be identical and when the device identification information comparison process is determined to be non-identical, the information processing apparatus reads out second BIOS setup value stored in the nonvolatile memory unit and replaces with the first BIOS setup value stored in the BIOS information memory unit.

5 Claims, 5 Drawing Sheets

INFORMATION PROCESSING APPARATUS, RESTORING METHOD OF BIOS SETUP, RESTORING PROGRAM

INCORPORATION BY REFERENCE

Priority is claimed on Japanese Patent Application No. 2010-289177, filed Dec. 27, 2010, the content of which is incorporated herein by reference.

BACKGROUND OF THE INVENTION

1. Field of the Invention

The present invention relates to an information processing apparatus, a restoring method of BIOS setup thereof, and a restoring program.

2. Description of Related Art

With respect to an information processing apparatus such as a PC (personal computer) or a server, when the information processing apparatus becomes non-bootable for unknown reason, in many cases, the whole information processing apparatus is replaced for restoration. If the BIOS (Basic Input/Output System) of the information processing apparatus is bootable before replacing the information processing apparatus, it is possible to record setup values (e.g., the priority of booting storage devices, validity/invalidity of each onboard device such as a RAID board, a sound board, or a LAN controller board, etc.), for example, a sheet of paper, so that the same setup values as those of the unbootable information processing apparatus are used in a replacement information processing apparatus by manually setting the setting values in the replacement information processing apparatus. However, if the BIOS of the information processing apparatus is unbootable, the setup values cannot be acquired, which is a problem because the previous setup values cannot be used in the replacement information processing apparatus. In such a case, the setup values, which have not been used as the previous setup values, are set for a replaced information processing apparatus. However, it is time-consuming work, and sometimes, the replaced information processing apparatus does not achieve the expected performance because of a setup error or the like, resulting in unnecessary operation costs.

As a setup value of BIOS is the unique data assigned to a single model of information processing apparatuses, the setup value cannot be applied to another model of an information processing apparatus. Furthermore, if a setup value of the unbootable information processing apparatus is applied to the replaced information processing apparatus whose model is different from that of the unbootable one, a problem may occur in that the replaced information processing apparatus may not perform normal operations. Thus it is required for preventing an unmatched setup value from being used for different model information apparatuses.

Furthermore, patent documents 1-4, which respectively correspond to Japanese Unexamined Patent Application, First Publication Nos. 2008-200943 (patent document 1), 2000-235483 (patent document 2), 2006-190061 (patent document 3), and 2009-211170 (patent document 4), describe the related art discussed above.

In order to solve the issues described above, a method is described in patent document 1 which proposes that a replacement apparatus is prepared for an original apparatus in advance, so that the setup value of the original is applied to the replacement apparatus and the original setup is restored when the original apparatus breaks down. However, this method costs for two apparatuses because this method needs to prepare the replacement apparatus.

Further, a method is described in patent document 2 which proposes that setup values of an original apparatus are backed up and the setup value is restored from the backup, so that the restoration is possible when trouble happens However, this method requires a user to manage the restoration. In addition, when the BIOS of the apparatus is unbootable, the setup value cannot be restored.

A method described in patent document 3 proposes that an attachable/detachable nonvolatile memory stores and uses a setup value that has been changed. However, since this method can set only a part of the changed setup value, another part of setup values are left in an original apparatus as being stored. In this case, there is a problem that when the original apparatus breaks down, another part of the setup values left in the original apparatus cannot be acquired, and therefore the setup value cannot be restored.

Furthermore, a method is described in patent document 4 which can store the changed information of a system configuration in an attachable/detachable nonvolatile memory and multiple systems can read out the changed information. However, in this method, in most cases, the setup values of BIOS cannot be apply to information apparatuses of different models, such problem needs to be solved.

SUMMARY OF THE INVENTION

Therefore, an object of the present invention is to provide an information processing apparatus, a method, and a program for restoring a BIOS setup value.

To achieve an object described above, an information processing apparatus in accordance with an exemplary embodiment of the present invention includes a BIOS information memory unit storing a first BIOS setup value, first device model information, and first device identification information, a device model information comparison unit performing a device model information comparison process, the device model information comparison process comparing the first device model information with second device model information stored in a nonvolatile memory unit being externally connected to the information processing apparatus based on a detection of a boot-up, a device identification information comparison unit performing a device identification information comparison process, the device identification information comparison process comparing the first device identification information with second device identification information stored into the nonvolatile memory unit being externally connected to the information processing apparatus based on the detection of the boot-up, and a restore process unit performing a restoring process, in the restoring process, the restoring process unit reading second BIOS setup value stored in the nonvolatile memory unit and replacing with the first BIOS setup value stored in the BIOS information memory unit when the device model information comparison process is determined to be identical and when the device identification information comparison process is determined to be non-identical.

Furthermore, in accordance with another exemplary embodiment of the present invention, a method for restoring a BIOS setup value of an information processing apparatus includes storing a first BIOS setup value, first device model information, and first device identification information into a BIOS information memory unit, performing a device model information comparison process using a device model information comparison unit, the device model information comparison process comparing the first device model information with second device model information stored in a nonvolatile memory unit being externally connected to the information processing apparatus based on detection of a boot-up, performing a device identification information comparison process using a device identification information comparison unit, the device identification information comparison process comparing the first device identification information with second device identification information stored in the nonvolatile memory unit being externally connected to the information processing apparatus based on the detection of the boot-up, and performing a restoring process using a restore process unit, in the restoring process, the restoring process unit reading second BIOS setup value stored in the nonvolatile memory unit and replacing with the first BIOS setup value stored in the BIOS information memory unit when a result of the device model information comparison process is determined to be identical and when a result of the device identification information comparison process is determined to be non-identical.

In accordance with another exemplary embodiment of the present invention, a computer-readable recording medium recording a restoring program for restoring a BIOS setup value of an information processing apparatus causes a computer to function as a BIOS information memory section storing a first BIOS setup value, first device model information, and first device identification information, a device model information comparison section performing a device model information comparison process, the device model information comparison process comparing the first device model information with second device model information stored in a nonvolatile memory section being externally connected to the information processing apparatus based on detection of a boot-up, a device identification information comparison section performing a device identification information comparison process, the device identification information comparison process comparing the first device identification information with second device identification information stored into the nonvolatile memory section being externally connected to the information processing apparatus based on the detection of the boot-up, and a restore process section performing a restoring process, in the restoring process, the restoring process section reading second BIOS setup value stored in the nonvolatile memory section and replacing with the first BIOS setup value stored in the BIOS information memory section when the device model information comparison process is determined to be identical and when the device identification information comparison process is determined to be non-identical.

In accordance with an exemplary embodiment of the present invention, it is possible to keep the same setup values even when an information processing apparatus becomes unbootable and replacement of the information apparatus is necessary for restoring the system, because the BIOS setup values are stored in an attachable/detachable nonvolatile memory.

Moreover, the method is considered for preventing to apply wrong setup values to different model apparatuses, mis-operation can be prevented and labor costs for restoring work can be reduced.

DETAILED DESCRIPTION OF THE INVENTION

In the following, a description will be given of an information processing apparatus in accordance with an exemplary embodiment of the present invention with reference to drawings.

Figure 1:
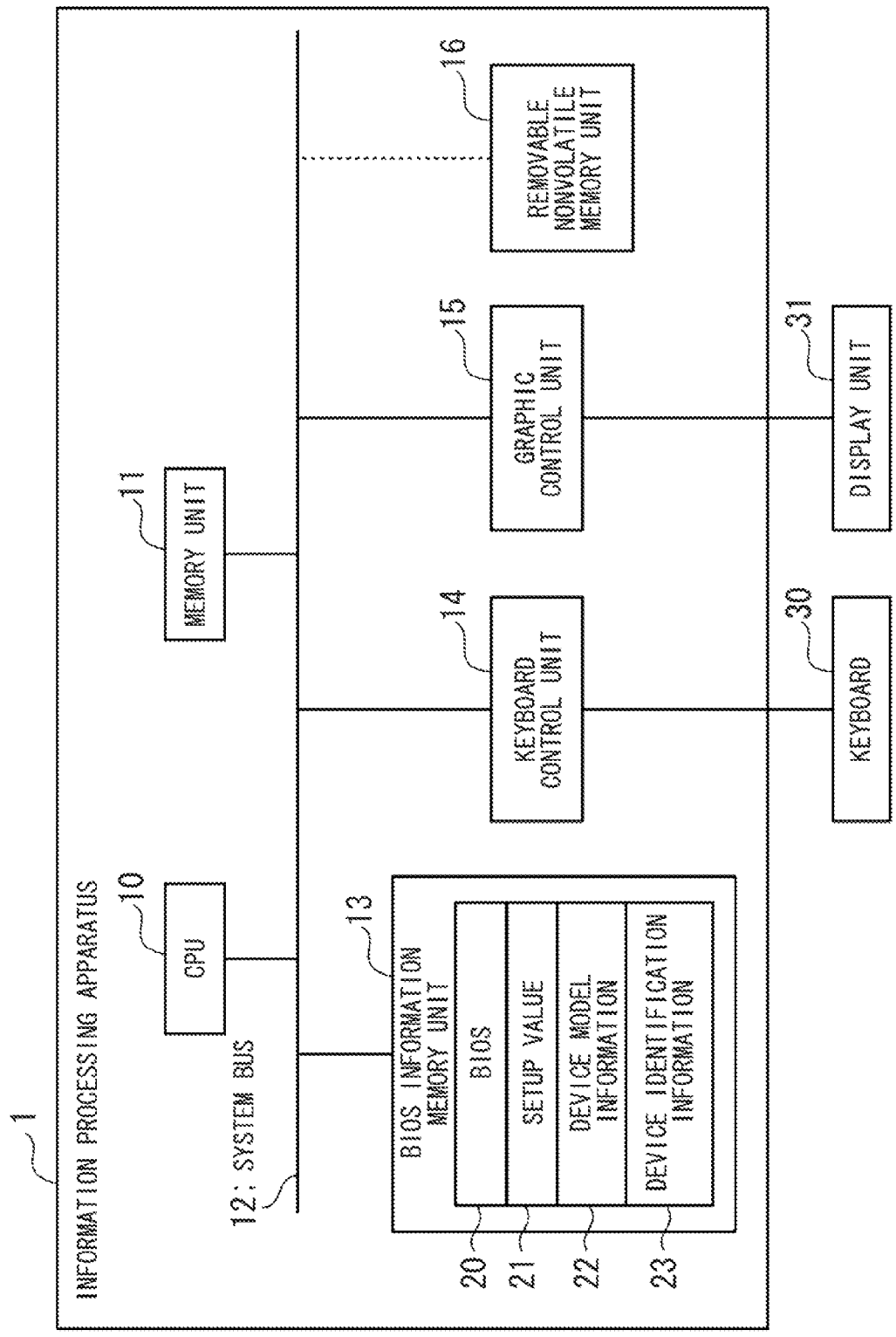
FIG. 1 is a block diagram that illustrates a configuration of an information processing apparatus.

FIG. 1 is a block diagram that illustrates a configuration of the information processing apparatus in accordance with the embodiment.

In the figure, a symbol 1 corresponds to an information processing apparatus such as a PC (personal computer) and a server. Also, the information processing apparatus 1 includes a CPU 10 controlling all of the operations of the information processing apparatus 1, a volatile main memory unit 11, a system bus 12, a BIOS information storage unit 13, a keyboard control unit 14, a graphics control unit 15, and a removable nonvolatile memory unit 16.

In this case, the keyboard control unit 14 is connected to a keyboard 30, and the graphics control unit 15 is connected to a display apparatus 31. The BIOS information storage unit 13 stores the program of a BIOS 20, a setup value 21, device model information 22 that can specify the model of the apparatus, and device identification information 23 that can identify the information processing apparatus 1.

Figure 2:
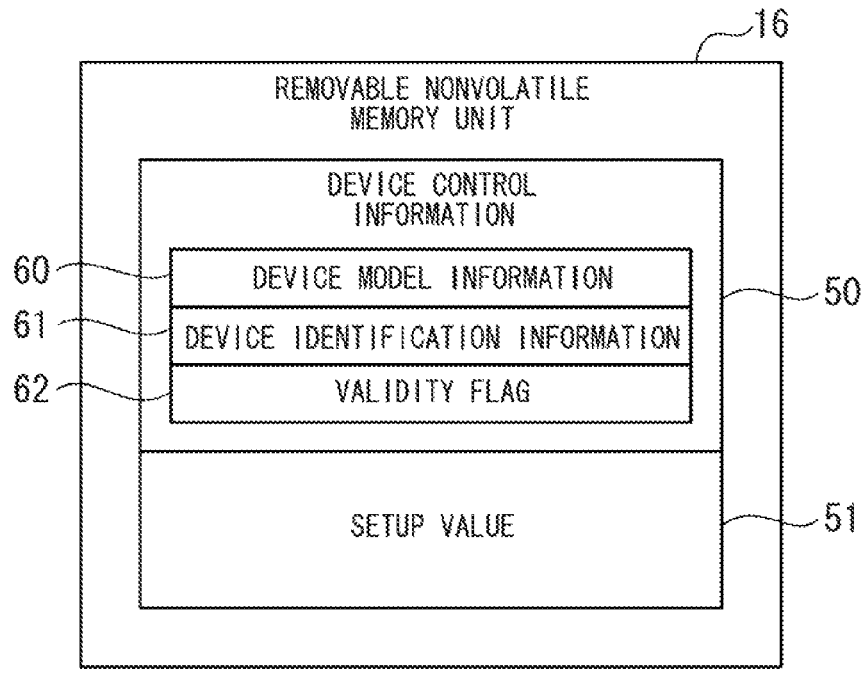
FIG. 2 is a drawing that illustrates information stored in a nonvolatile memory unit.

FIG. 2 is a drawing that illustrates information stored by a nonvolatile memory unit.

The removable nonvolatile memory 16 stores device control information 50 and a setup value 51 as shown in FIG. 2. The device control information 50 stores information such as device model information 60, device identification information 61, and a validity flag indicating whether or not the setup value 51 is valid.

Figure 3:
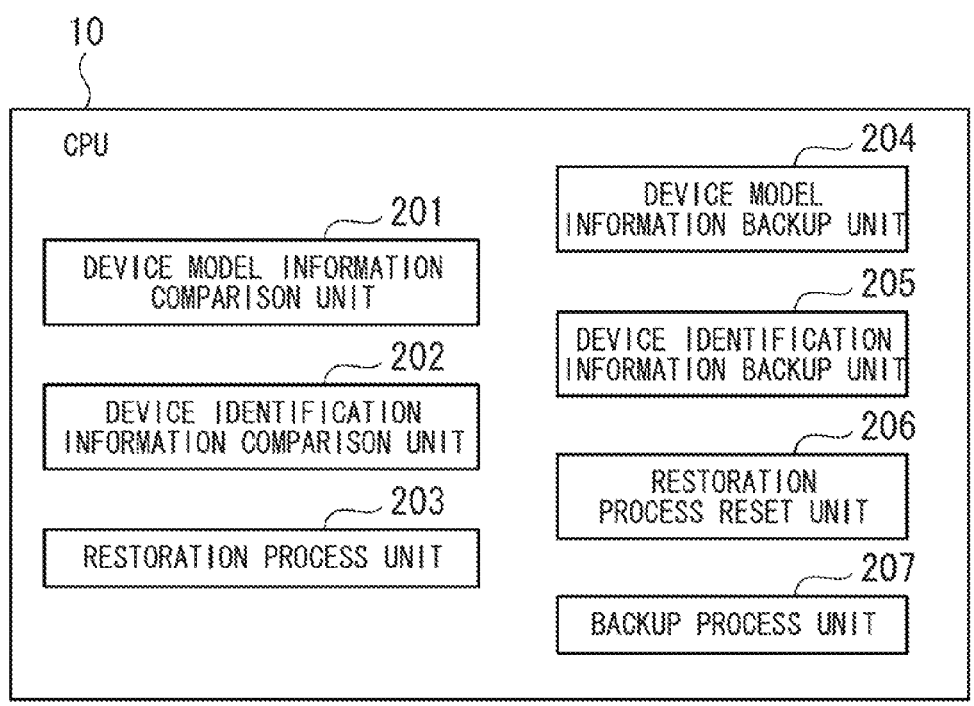
FIG. 3 is a block diagram that illustrates functions obtained by a CPU running a BIOS.

FIG. 3 is a function block diagram indicating functions that the CPU 10 obtains by executing the BIOS.

The CPU 10 obtains the functions of each processing unit shown in FIG. 3 by reading and executing the BIOS 20 from the BIOS information storage unit 13.

As shown in FIG. 3, the CPU 10 obtains the functions of a device model information comparison unit 201 which performs a device model information process which compares the device model information 22 (first device model information) and the device model information 60 (second device model information) stored in the nonvolatile memory unit 16 externally connected to the information processing apparatus 1 based on the detection of a boot-up.

Furthermore, the CPU 10 obtains the functions of the device identification information comparison unit 202 which performs a device identification information comparison process which compares the device identification information (first device identification information) 23 and the device identification information (second device identification information) 61 stored in the nonvolatile memory unit 16 based on the detection of the boot-up.

Moreover, the CPU 10 obtains the functions of the restore process unit 203 performing a restore process which updates the BIOS setup value 21 stored in the BIOS information storage unit 13 by reading out the BIOS setup value 51 stored in the nonvolatile memory unit 16, when a result of the device model information comparison process is determined to be identical and a result of the device identification information comparison process is determined to be non-identical.

Furthermore, the CPU 10 obtains the functions of the device model information backup unit 204 which updates the device model information 60 stored in the nonvolatile memory unit 16 with the device model information 22 of each information processing apparatus 1, when the result of the device model information comparison process is determined to be non-identical.

Also, the CPU 10 obtains the backup functions of the device model information backup unit 204 that updates the device model information 60 stored in the nonvolatile memory 16 with the device model information 22 of each information processing apparatus when the result of the device model information comparison process is determined to be non-identical.

Moreover, the CPU 10 includes the function of the device identification information backup unit 205 that updates the device identification information 61 stored in the nonvolatile memory unit 16 with the device identification information 23 of each information processing apparatus when a result of the device identification information comparison process is determined to be identical.

The CPU 10 obtains the function of the restore process reset unit 206 that resets the restore end flag indicating whether or not the restore process is performed after the restore process has been finished.

In addition, the CPU 10 includes the functions of the backup process unit 207, which updates the BIOS setup value stored in the nonvolatile memory unit 16 with the BIOS setup value stored in the BIOS information storage unit 13 when the result of the device model information comparison process is determined to be non-identical or the result of the device identification information is determined to be identical.

Figure 4:
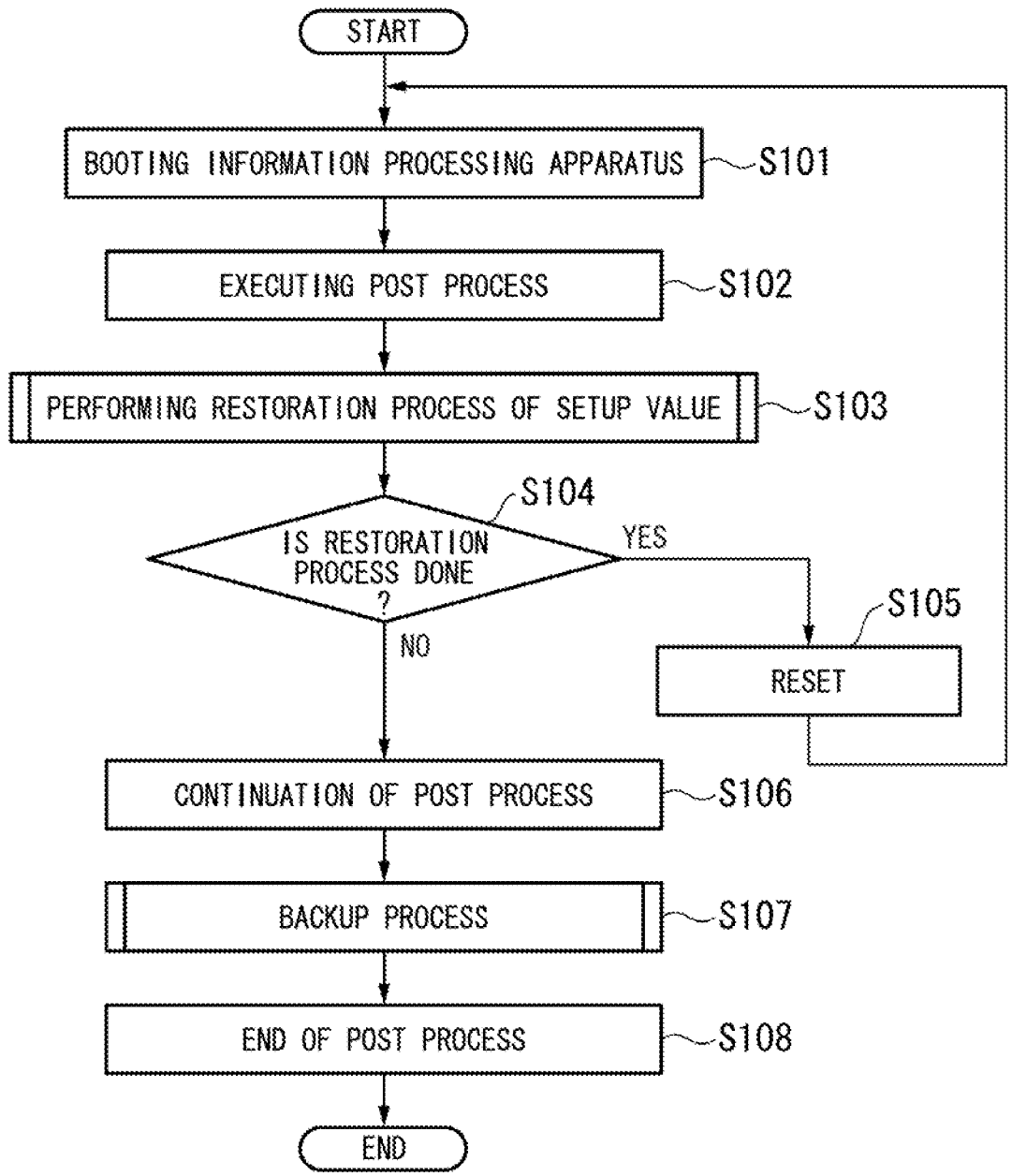
FIG. 4 is a flowchart that illustrates a process flow of the information processing apparatus.

FIG. 4 is a flowchart that illustrates a process flow of the information processing apparatus.

Figure 5:
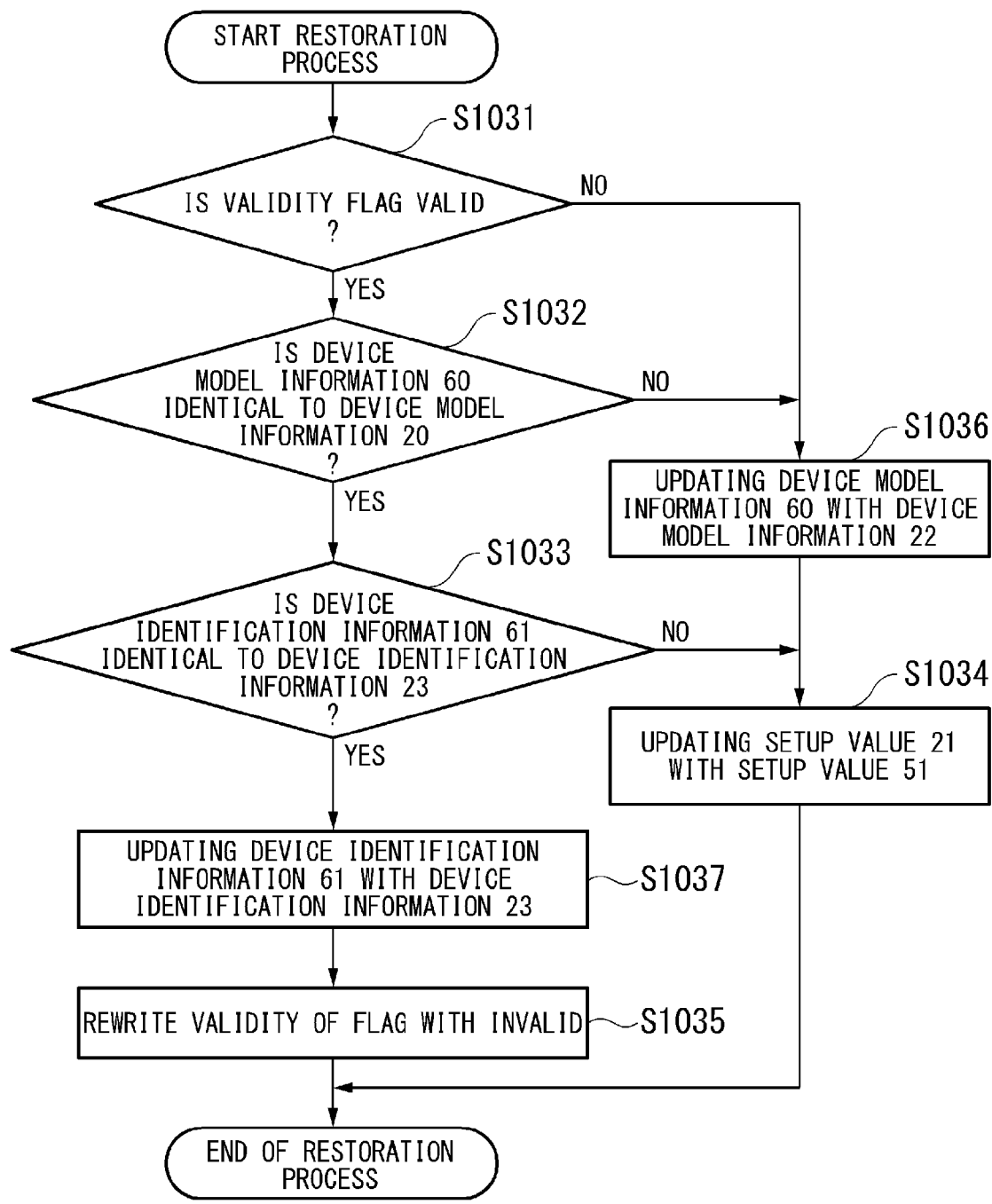
FIG. 5 is a flowchart that illustrates a restoration process in the information processing apparatus.

FIG. 5 is a flowchart that illustrates a restoration process in the information processing apparatus.

Figure 6:
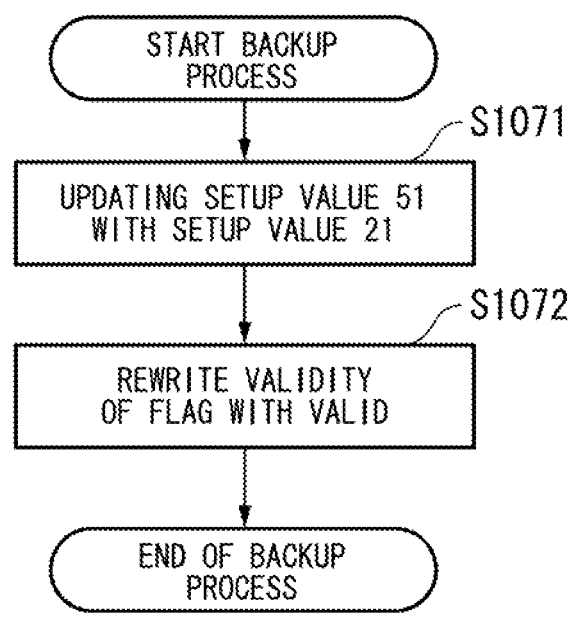
FIG. 6 is a flowchart that illustrates a backup process in the information processing apparatus.

FIG. 6 is a flowchart that illustrates a backup process in the information processing apparatus.

Next, with reference to FIGS. 4-6, a description will be given of the process of the information processing apparatus in detail based on the process order in accordance with the present embodiment.

First, in response to an instruction input by a user for booting (e.g., pressing a power button), the CPU 10 of the information processing apparatus 1 detects the instruction input and reads out the BIOS from the BIOS information storage unit 13 and starts booting the information processing apparatus (step S101). Then, the CPU 10 executes the POST (Power On Self Test) process (step S102). In the POST process, the CPU 10 executes the restoration process based on a setup value from the nonvolatile memory unit 16 (step S103).

In the restore process, as shown in FIG. 5, the CPU 10 reads out the validity flag 62 from the storage area of the device control information 50 in the nonvolatile memory unit 16. Then, the CPU 10 determines whether the validity flag 62 is "valid" or "invalid" (step S1031). If the validity flag 62 is set to "valid", then the device model information comparison unit 201 reads out the device model information 60 from the nonvolatile memory unit 16. Furthermore, the device model comparison unit 201 compares and determines whether or not the device model information 60 read from the nonvolatile memory unit 16 and the device model information 22 preliminarily stored in the BIOS information storage unit 13 are identical (step S1032). If both devices' model information is identical, then the device identification information comparison unit 202 reads out the device identification information 61 from the nonvolatile memory unit 16. Further, the device identification information comparison unit 202 compares and determines whether or not the device identification information 61 read from the nonvolatile memory unit 16 is identical to the device identification information 23 preliminarily stored in the BIOS information storage unit 13 (step S1033).

Furthermore, when the identification information of both devices is indicated as "non-identical" in step S1033, the restore process unit 203 reads out the setup value 51 stored in the nonvolatile memory unit 16, and performs a restore process which updates the setup value 21 stored in the BIOS information storage unit 13 with the setup value 51 read from the nonvolatile memory unit 16 (step S1034). Then, the restore process unit 203 changes the validity flag 62 stored in the nonvolatile memory 16 to "invalid" (step S1035). When the validity flag 62 is indicated as "valid," the setup value 51 stored in the nonvolatile memory unit 16 is valid. This indicates that the setup value 51 may be used to update (restore) the setup value 21 stored in the BIOS information storage unit 13. On the other hand, when the validity flag 62 is indicated as "invalid," the setup value 51 stored in the nonvolatile memory unit 16 is invalid. This indicates that the setup value 51 cannot be used to update (must not restore) the setup value 21 stored in the BIOS information storage unit 13.

In step S1031, if the validity flag 62 is indicated as "invalid," or the device model information is indicated as "non-identical" in step S1032, in other words, if the setup values stored in the nonvolatile memory unit 16 is that of another information processing apparatus 1 whose model is different from the present information processing apparatus, then the device model information backup unit 204 reads out the device model information 22 recorded in the BIOS information storage unit 13. Further, the device model information backup unit 204 updates the device information 60 stored in the nonvolatile memory unit 16 with the device model information 22 read from the BIOS information storage unit 13 (step S1036).

Moreover, in step S1033, if the information identification information is indicated as "identical," in other words, if the setup value stored in the nonvolatile memory unit 16 and the setup value stored in the BIOS information storage unit 13 indicate the setup value of an identical information processing apparatus and there is no need to perform the restore process, then the device identification information backup unit 205 reads the device identification information 23 stored in the BIOS information storage unit 13. Further, the device model information backup unit 204 updates the information identification information 61 stored in the nonvolatile memory unit 16 with the device identification information 23 read from the BIOS information storage unit 13 (step S1037), and proceeds to a process that changes the validity flag of step S1035 to "invalid."

As described above, through the process steps S1031-S1037, the restore process of step S103 is finished. When the restore process ends, the restore process unit 203 records information indicating "the end of a restore process" in the BIOS information storage unit 13 or the like.

In the next step, when the restore process has finished, the restore process reset unit 206 determines whether or not the BIOS information storage unit 13 has information indicating "the end of a restore process," so that the restore process reset unit 206 determines whether or not the restore process has been performed (step S104). If the information on "the end of a restore process" is recorded, then the restore process reset unit 206 determines that a restore process has been performed, and performs a reset process which resets a restore end flag indicating whether or not the restore process has been performed (step S105). Specifically, the reset process is a process that rewrites the information on "the end of a restore process" with information indicating "an unfinished restore process." Further, the CPU 10 repeats process steps from the boot-up process in step S101 above.

If the process is repeated, the device identification information in step S1033 of FIG. 5 is the same, then the restore process is not performed and the restore process flow reaches the end of the process.

On the other hand, if step S104 determines that a restore process has not been performed, in other words, if the information indicating "unfinished restore process" is recorded in the BIOS information storage unit 13, then the CPU 10 continues the POST process (step S106). Further, the backup process unit 207 performs a backup process (step, S107). In the backup process, the CPU 10 reads out a BIOS setup value 21 stored in the BIOS information storage unit 13 and updates the BIOS setup value 51 stored in the nonvolatile memory unit 16 with the BIOS setup value 21 stored in the BIOS information storage unit 13 (step S1071). Then the backup process unit 207 rewrites the validity flag 62 recorded in the nonvolatile memory unit 16 with "valid" (step S1072). Thereby, the backup process in step S107 is finished, and the CPU 10 finishes the POST process (step S108), and the CPU 10 performs a boot-up of an OS (Operation System).

In the above, an embodiment in accordance with the present invention has been described. In accordance with an embodiment of the present invention, it is possible to keep the same setup values even when an information processing apparatus becomes unbootable and replacement of the information apparatus is necessary for restoring the system, because the BIOS setup values are stored in an attachable/detachable nonvolatile memory.

Moreover, the method is considered for preventing to apply wrong setup values to different model apparatuses, mis-operation can be prevented and labor costs for restoring work can be reduced.

In addition, a backup/restoration process of a setup value is carried out in a POST processing while booting up, the restoration of the setup values can be performed to another information processing apparatus without user's inputs.

The information processing apparatus described above includes a computer system. The operation processes described above are stored in a computer-readable recording medium as a program, and the above processing is carried out when the computer reads out and executes the program. Examples of the computer-readable recording medium include a magnetic disk, an optical magnetic disk, a CD-ROM, a DVD-ROM, a semiconductor memory or the like. Further, this computer program may be distributed to a computer via a communication line and the computer having received the program may execute the program.

The program above may be a program which can achieve part of the functions described above.

Moreover, the program may be a differential file (differential program) which can be combined with a program already recorded in a computer system and used to achieve the functions described above.

While preferred embodiments of the invention have been described and illustrated above, it should be understood that these are examples of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An information processing apparatus comprising:
    a BIOS information memory unit which stores a first BIOS setup value, first device model information, and first device identification information;
    a device model information comparison unit which performs a device model information comparison process, the device model information comparison process comparing the first device model information with second device model information stored in a nonvolatile memory unit being externally connected to the information processing apparatus based on a detection of a boot-up;
    a device identification information comparison unit which performs a device identification information comparison process, the device identification information comparison process comparing the first device identification information with second device identification information stored into the nonvolatile memory unit being externally connected to the information processing apparatus based on the detection of the boot-up; and
    a restore process unit which performs a restoring process, in the restoring process, the restoring process unit reading a second BIOS setup value stored in the nonvolatile memory unit and replacing the first BIOS setup value stored in the BIOS information memory unit with the second BIOS setup value when the device model information comparison process is determined to be identical and when the device identification information comparison process is determined to be non-identical
    a restoration process reset unit which records restoration information into a restoration process flag, the restoration information indicating an unfinished restoration state when a restoration end flag is reset, the restoration end flag indicating whether or not the restoration process has been performed; and
    a backup process unit which updates the BIOS setup value stored in the nonvolatile memory unit with the BIOS setup value stored in the BIOS information memory unit when the restoration process flag indicates the unfinished restoration state and when a result of the device identification information comparison process is determined to be identical.

2. The information processing apparatus according to claim 1, further comprising:
    a device model information backup unit which updates the second device model information stored in the nonvolatile memory unit with the first device model information of the first information processing apparatus when a result of the device model information comparison process is determined to be non-identical; and
    a device identification information backup unit which updates the second device identification information stored in the nonvolatile memory unit with the first device identification information of the information processing apparatus when a result of the device identification comparison process is determined to be identical.

3. A method for restoring a BIOS setup value of an information processing apparatus, comprising:
    storing a first BIOS setup value, first device model information, and first device identification information into a BIOS information memory unit;
    performing a device model information comparison process using a device model information comparison unit, the device model information comparison process comparing the first device model information with second device model information stored in a nonvolatile memory unit being externally connected to the information processing apparatus based on detection of a boot-up;

performing a device identification information comparison process using a device identification information comparison unit, the device identification information comparison process comparing the first device identification information with second device identification information stored in the nonvolatile memory unit being externally connected to the information processing apparatus based on the detection of the boot-up;

performing a restoring process using a restore process unit, in the restoring process, the restoring process unit reading a second BIOS setup value stored in the nonvolatile memory unit and replacing the first BIOS setup value stored in the BIOS information memory unit with the second BIOS setup value when a result of the device model information comparison process is determined to be identical and when a result of the device identification information comparison process is determined to be non-identical;

recording restoration information into a restoration process flag, the restoration information indicating an unfinished restoration state when a restoration end flag is reset, the restoration end flag indicating whether or not the restoration process has been performed; and updating the BIOS setup value stored in the nonvolatile memory unit with the BIOS setup value stored in the BIOS information memory unit when the restoration process flag indicates the unfinished restoration state and when a result of the device identification information comparison process is determined to be identical.

4. The method for restoring a BIOS setup value according to claim 3, wherein updating the second device model information stored in the nonvolatile memory unit with the first device model information of the information processing apparatus when a result of the device model information comparison process is determined to be non-identical; and updating the second device identification information stored in the nonvolatile memory unit with the first device identification information of the information processing apparatus when a result of the device identification information comparison process is determined to be identical.

5. A non-transitory computer-readable recording medium recording a restoring program for restoring a BIOS setup value of an information processing apparatus, the program causing a computer to function as:

a BIOS information memory section configured to store a first BIOS setup value, first device model information, and first device identification information;

a device model information comparison section configured to perform a device model information comparison process, the device model information comparison process comparing the first device model information with second device model information stored in a nonvolatile memory section being externally connected to the information processing apparatus based on detection of a boot-up;

a device identification information comparison section configured to perform a device identification information comparison process, the device identification information comparison process comparing the first device identification information with second device identification information stored into the nonvolatile memory section being externally connected to the information processing apparatus based on the detection of the boot-up;

a restore process section configured to perform a restoring process, in the restoring process, the restoring process section reading a second BIOS setup value stored in the nonvolatile memory section and replacing the first BIOS setup value stored in the BIOS information memory section with the second BIOS setup value when the device model information comparison process is determined to be identical and when the device identification information comparison process is determined to be non-identical;

a restoration process reset unit which records restoration information into a restoration process flag, the restoration information indicating an unfinished restoration state when a restoration end flag is reset, the restoration end flag indicating whether or not the restoration process has been performed; and a backup process unit which updates the BIOS setup value stored in the nonvolatile memory unit with the BIOS setup value stored in the BIOS information memory unit when the restoration process flag indicates the unfinished restoration state and when a result of the device identification information comparison process is determined to be identical.

* * * * *